March 14, 1944.  A. E. McCAWLEY  2,344,315
OIL LEAKAGE INDICATOR
Filed July 8, 1942  2 Sheets-Sheet 1
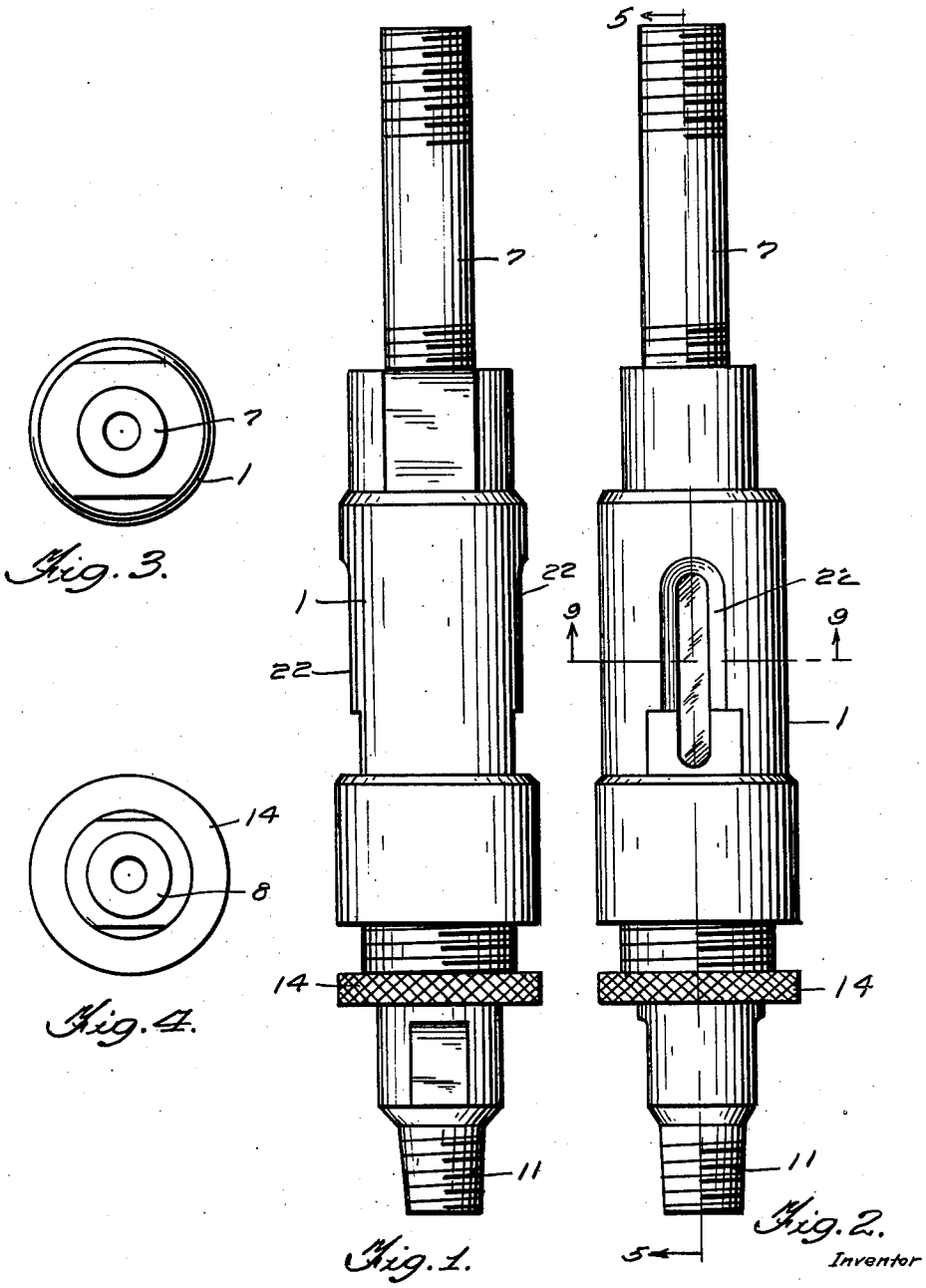
Inventor
ALVIN E. McCAWLEY March 14, 1944.  A. E. McCAWLEY  2,344,315
OIL LEAKAGE INDICATOR
Filed July 8, 1942   2 Sheets-Sheet 2
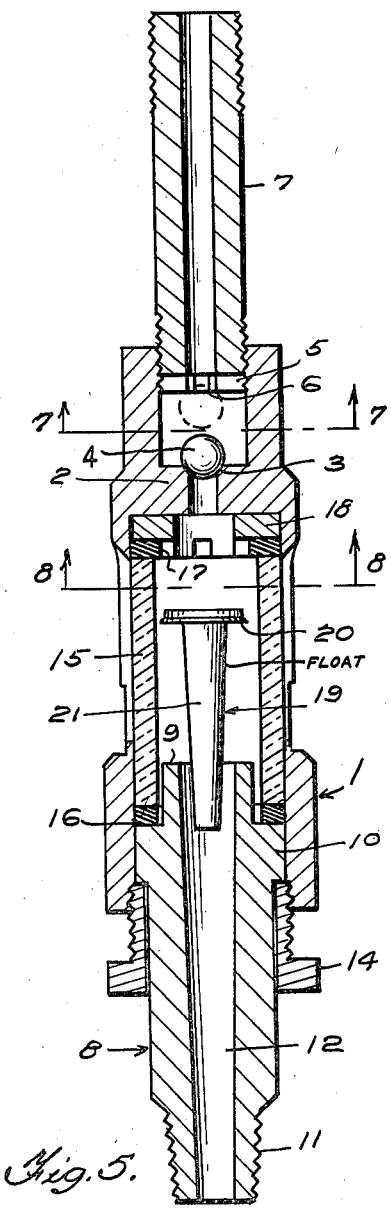
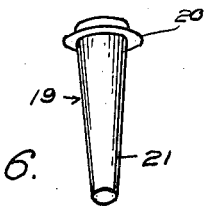
Fig. 6.
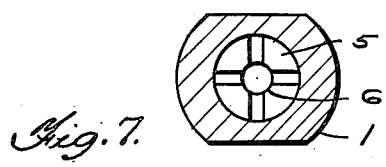
Fig. 7.
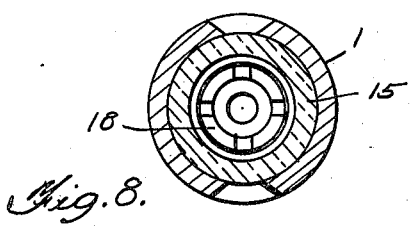
Fig. 8.
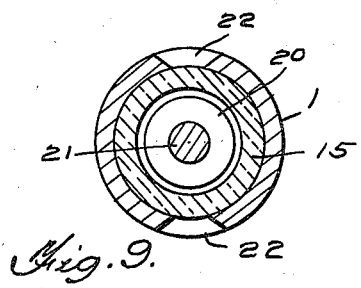
Fig. 9.
Fig. 5.
Inventor
ALVIN E. McCAWLEY
By Clarence A. O'Brien
and Harvey B. Jacobson
Attorneys.

Patented Mar. 14, 1944

2,344,315

UNITED STATES PATENT OFFICE 2,344,315

OIL LEAKAGE INDICATOR

Alvin E. McCawley, Mont Belvieu, Tex., assignor of one-half to Darrell E. Williams, Mont Belvieu, Tex.

Application July 8, 1942, Serial No. 450,175

1 Claim. (Cl. 73—51)

My invention relates to improvements in oil leakage indicators of the flow meter type for use in indicating leakage of seal oil past pump packing in high speed centrifugal pumps handling light fractions of gasoline.

By way of premise, in the pumping of light hydrocarbon fractions, it is conventional practice to connect the seal oil lines of a battery of centrifugal pumps in parallel with a common source of seal oil applied at pressure above the pump suction pressures. If oil leakage occurs through the pump packings in excess of a predetermined, immaterial amount, the oil content of the gasoline exceeds the tolerance limit and the gasoline becomes unmarketable. Under such excessive leakage, the pumps must be tested separately to detect the one leaking excessivly so that it may be bypassed until repacked.

Having the foregoing in mind, it is the principal object of my invention to provide a simply constructed, efficient indicator adapted for quick and easy installation in the oil seal lines to indicate accurately and instantly excessive use of seal oil in the related pump, and hence excessive leakage therethrough, so that such a pump, or pumps, may be bypassed before the oil content of the gasoline being pumped becomes too high.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in side elevation of my improved indicator in its preferred embodiment, Figure 2 is a similar view with the indicator turned to a 90 degree angle.

Figure 3 is a view in end elevation of the upper end of the indicator,

Figure 4 is a similar view of the lower end of the indicator,

Figure 5 is a view in longitudinal section taken on the line 5—5 of Figure 2,

Figure 6 is a view in perspective of the indicating member,

Figure 7 is a view in transverse section taken on the line 7—7 of Figure 5,

Figure 8 is a similar view taken on the line 8—8 of Figure 5, and

Figure 9 is another similar view taken on the line 9—9 of Figure 2.

Referring to the drawings by numerals, my improved oil leakage indicator comprises a sectional elongated unit adapted for installation in upright position and embodying an intermediate tubular sleeve section 1 having therein, adjacent its upper end, a radial annular flange 2 forming a valve seat 3 for a ball-type, back pressure valve 4 seating by gravity, and a valve chamber 5 above said seat. Above the flange 2 is a radially slotted disk 5 threaded into said upper end of the section 1 and which is provided with an axial bottom seat 6 against which the ball 4 may impinge upwardly under upward fluid pressure thereagainst, while the slotted disk 5 passes fluid therethrough. Arising from the upper end of the section 1 and threaded therein against the disk 5 is a short pipe section 7 having an externally threaded upper end for coupling in a seal oil line, not shown.

Depending out of the lower end of the section 1 is a shouldered bottom tubular section 8 having a reduced upper end 9, an external annular shoulder 10 below said end, fitting into section 1, a lower, threaded, reduced end 11 for coupling in said seal oil line, and an upwardly flaring axial bore 12. A gland nut 14 threaded upwardly into the lower end of the section 1 against the shoulder 10 retains the bottom section 8 in said section 1.

A tubular sight glass 15 is fitted into section 1 and around the reduced end 9 of the bottom section 8 with its lower end seating on a resilient sealing gasket 16 seating on the shoulder 10. A similar gasket 17 is interposed between the upper end of the sight glass 15 and a radially grooved, centrally bored disk 18 fitting into section 1 against the under side of the flange 2 and forming a seat limiting upward movement of an indicating member, presently described, permitting upward flow of fluid through the disk. The sight glass 15, gaskets 16, 17 and disk 18 are clamped together between the shoulder 10 and flange 2 by the gland nut 14.

The indicating member 19 is confined in the sight glass 15 by the section 8 and disk 18 and comprises a flat head 20 smaller in diameter than the internal diameter of the sight glass 15 to permit the passage of fluid upwardly past the same and through said sight glass, which head normally seats on top of the end 9 of the bottom section 8, said member further comprising a downwardly tapering shank 21 for entering the bore 12 of the bottom section 8 with a clearance to permit fluid to flow through said bore 12 at all times. The indicating member 19 is of a buoyant material and specific gravity such that under a predetermined hydraulic pressure in the device, corresponding to the normal pump pressure, said member will be lifted upwardly in the sight glass 15 to a definite position for visibility through a pair of diametrically opposite sight slots 22 provided in the intermediate section 1. The sight glass 15 may be provided with calibrations, not shown, for indicating the described position of the head 20 of member 19 and positions above and below said definite position.

The operation of my improved indicator will be readily understood. The indicator is installed in the seal oil supply line of a pump closely adjacent to the latter. As long as the pressure in the line, and hence in the device, is maintained in accordance with the pump pressure, the indicating member 19 will maintain a definite elevated position indicating that excessive leakage from the line does not occur. Since, under excessive leakage from the line, the pressure therein will fall, the indicating member will consequently drop to indicate such excessive leakage.

The foregoing will, it is believed, suffice to impart a clear understanding of my invention without further explanation.

Manifestly, the invention, as described, is susceptible of modification without departing from the invention concept, and right is herein reserved to such modifications as fall within the scope of the subjoined claim.

What I claim is:

An oil leakage indicator having the form of an elongated sectional unit adapted to be interposed in upstanding position in an oil line feeding oil under pressure, said unit comprising a tubular sleeve section provided with longitudinally extending sight slots therein, a back pressure valve in the upper end of said sleeve section, a tubular bottom section slidably fitted in the lower end of the sleeve section and depending therefrom, said bottom section having an upwardly flaring bore, a tubular sight glass fitted in said sleeve section and retained therein by said bottom section, a gland nut threaded into the lower end of the sleeve section and retaining the bottom section in the sleeve section, and an indicator member having a tapered shank normally depending in said bore with a clearance and a flat enlarged head normally seating on the upper end of the bottom section, said check valve comprising a gravity seating ball, and said sleeve section having an annular flange in its upper end forming a seat for said ball, and a spider in the upper end of said sleeve section for limiting opening movement of said ball and formed to pass oil out of said sleeve section.

ALVIN E. McCAWLEY.